United States Patent [19]

Kushnick

[11] Patent Number: 4,781,502

[45] Date of Patent: Nov. 1, 1988

[54] ANTI-ROTATION LOCKING DEVICE FOR FASTENERS

[75] Inventor: Steven B. Kushnick, Jupiter, Fla.

[73] Assignee: The United States of America as represented by the Secretary of the Air Force, Washington, D.C.

[21] Appl. No.: 112,162

[22] Filed: Oct. 26, 1987

[51] Int. Cl.⁴ .......................................... F16B 39/10
[52] U.S. Cl. .................................... 411/87; 411/96; 411/93; 411/97; 411/98; 411/150; 411/966
[58] Field of Search .................... 411/95, 96–98, 411/92–94, 87, 88, 90, 150, 149, 166, 169, 966

[56] References Cited

U.S. PATENT DOCUMENTS

| 147,273 | 2/1874 | Lamb | 411/98 |
|---|---|---|---|
| 199,303 | 1/1878 | McConnell . | |
| 697,870 | 4/1902 | McDonald | 411/95 |
| 1,099,292 | 6/1914 | Gibbs | 411/95 |
| 1,190,414 | 7/1916 | Hughes et al. | 411/93 |
| 1,427,566 | 8/1922 | Wear et al. . | |
| 1,498,686 | 6/1924 | Farnsworth | 411/98 |
| 2,370,944 | 3/1945 | Emerson | 151/32 |
| 2,758,628 | 8/1956 | Rice | 151/54 |
| 3,467,417 | 9/1969 | Ollis, Jr. et al. | 411/966 X |
| 3,727,969 | 4/1973 | Eddy et al. | 411/96 X |
| 4,267,870 | 5/1981 | Warner | 411/98 |

FOREIGN PATENT DOCUMENTS 3930  2/1892  United Kingdom ............... 411/98

Primary Examiner—Lloyd A. Gall
Assistant Examiner—Curtis B. Brueske
Attorney, Agent, or Firm—Richard J. Donahue; Donald J. Singer

[57] ABSTRACT

An anti-rotation locking device for threaded fasteners which secure rotating parts subject to vibration, shock and the like. The device comprises a strap member and one or more retainer members. The strap member is positioned under the fasteners and the retainer members each have a toothed opening which is installed over the matching wrenching surface of the fastener. Each retainer member also has an arcuate slot which is positioned above an arcuate tang on the strap member. The tang is lifted, passed through the slot, bent about the bottom of the slot and folded back over the top surface of the retainer member to thereby restrain the loosening of the fastener.

5 Claims, 2 Drawing Sheets

ANTI-ROTATION LOCKING DEVICE FOR FASTENERS

STATEMENT OF GOVERNMENT INTEREST

The invention described herein may be manufactured and used by the Government for governmental purposes without the payment of any royalty thereon.

BACKGROUND OF THE INVENTION

The present invention relates generally to an anti-rotation locking device for threaded fasteners, such as nuts and bolts, which are subject to being loosened by vibration or shock. It is especially directed to an anti-rotation locking device which will accommodate any angle or turn of a nut or bolt having a multi-point wrenching surface and securing rotating parts in a gas turbine engine.

The broad concept of using a washer-like member having bendable tabs which bear against a square nut and an adjacent structural member, to prevent rotation of the nut with respect to the member, is disclosed in U.S. Pat. No. 199,303.

U.S. Pat. No. 1,427,566 discloses a pair of hinged plates which hold a plurality of square nuts and restrain them against rotation.

U.S. Pat. No. 2,370,944 discloses a cap screw locking device having a splined or toothed opening which fits over the matching multi-point head of a cap screw, and has bendable tabs or ears which engage an assembly to prevent relative movement between the cap screw and the assembly.

U.S. Pat. No. 2,758,628 discloses a rotation restraining means for a plurality of polygonal head wheel lugs which are arranged in a circular pattern. A spring steel rod extends through slots in clip members whose toothed openings engage the polygonal heads of the wheel lugs.

U.S. Pat. No. 4,267,870 discloses a locking strip for locking two or more bolts each having a multi-point wrenching head and an infraposed hexagonal collar. Locking tabs on the locking strip each engage a flat chordal surface on the hexagonal collar of a bolt to secure the bolt against rotation.

As noted in U.S. Pat. No. 4,267,870, supra, cap head screws having multi-point wrenching heads are often preferred over socket head cap screws for the fastening of parts, in that they provide for tighter and faster wrenching. In addition, such fasteners with multi-point wrenching heads are usually lighter in weight, have less flange width, and are less costly for a given torque requirement.

The improved wrenching results because of the external and increased peripheral wrench-engaging surface on the head of the screw which provides for better leverage. Also, plural wrenching surfaces are advantageously angled substantially radially and disposed radially outwardly to a greater extent than the wrenching surfaces of socket head cap screws, thereby improving the wrenching angle and leverage. This increases substantially the amount of torque that can be applied before the screw head deforms, as compared to comparatively sized socket head cap screws. Accordingly, ultimate cost, weight and size can be reduced by employing multi-point wrenching screws over socket head cap screws. It will be appreciated that the aforementioned desirable characteristics of such multi-point cap screws are equally applicable to threaded nuts of like peripheral shape.

In many applications, such as turbines, compressors, engines and the like, where rotating assemblies are subjected to vibration and shock, it may be necessary or prudent to provide a locking means for multi-point wrenching head nuts (or bolts) including types thereof which do not have the locking collar feature disclosed in the aforementioned U.S. Pat. No. 4,267,870. Such nuts having an infraposed hexagonal locking collar may not even be desirable for use in some applications in that the flat peripheral surfaces of the locking collar can only provide a limited number of discrete angular locking positions at which positions the nuts may be over or under torqued.

OBJECTS AND SUMMARY OF THE INVENTION

It is therefore the primary object of the present invention to provide an improved anti-rotation locking device for threaded fasteners.

It is a further and more specific object of the present invention to provide an anti-rotation locking device for fasteners of the type having multi-point wrenching surfaces.

It is yet another object of the present invention to provide an anti-rotation locking device for nuts and bolts, which device will accommodate any angle of turn of the nuts or bolts.

It is yet another object of the present invention to provide an anti-rotation locking device for either threaded nut or bolt fasteners, which device has a means for assuring the proper angular position of installation of the retainer member over the fasteners.

In accordance with the present invention, an anti-rotation device prevents the loosening of one or more threaded nut (or bolt) fasteners in an assembly of parts subjected to vibratory, cyclical, or other stresses. The device comprises a common strap member, and an individual retainer member for each nut. The strap member spans and is positioned under the several nuts which secure the assembly of parts, and has a plurality of bendable arcuate tangs, one for each nut, extending therefrom. Each retainer member has a toothed opening which corresponds in size and shape to the periphery of its related nut, and has an arcuate slot formed therethrough. After a retainer is placed over a nut in a manner such that the slot in the retainer is properly aligned with its related strap tang, the tang is lifted, passed through the slot and bent about the bottom of the slot and the top surface of the retainer to capture the retainer and thereby prevent rotation of the nut in a loosening direction. The specific angle-of-turn of a nut in any instance is accommodated by the length of the strap tang and the radii of the tang and the retainer slot. A twelve-sided nut, for example, requires plus or minus fifteen degrees of possible retainer member rotation to be lockable at any nut orientation.

A particular embodiment of the invention includes the addition of two tabs which extend from the edge of the retainer to bear against either a raised flange or a pin which projects above one of the joined parts. The tabs assure that the retainer is necessarily installed over the nut in an angular sector which is within the effective capture range of the underlying strap tang.

Another alternate embodiment of the invention provides for locking of a single nut or bolt when a flange is available on the assembly, by causing the underlying strap to abut the flange and thus preclude rotation.

The foregoing and other objects, advantages and features of the present invention will become apparent from the following detailed descriptions of the preferred embodiments thereof when read in conjunction with the accompanying drawings. Identical elements have been given the same reference numeral which is primed or double primed in the succeedingly-disclosed embodiments of the invention.

DETAILED DESCRIPTION OF THE INVENTION

While the drawings and this detailed description specifically depict and refer to an anti-rotation device for locking one or more nuts which are threaded onto bolts to join two or more parts, it will be readily apparent that the anti-rotation locking device of the present invention is equally applicable for use in locking the similar wrenching heads of threaded bolts as well.

Figure 1:
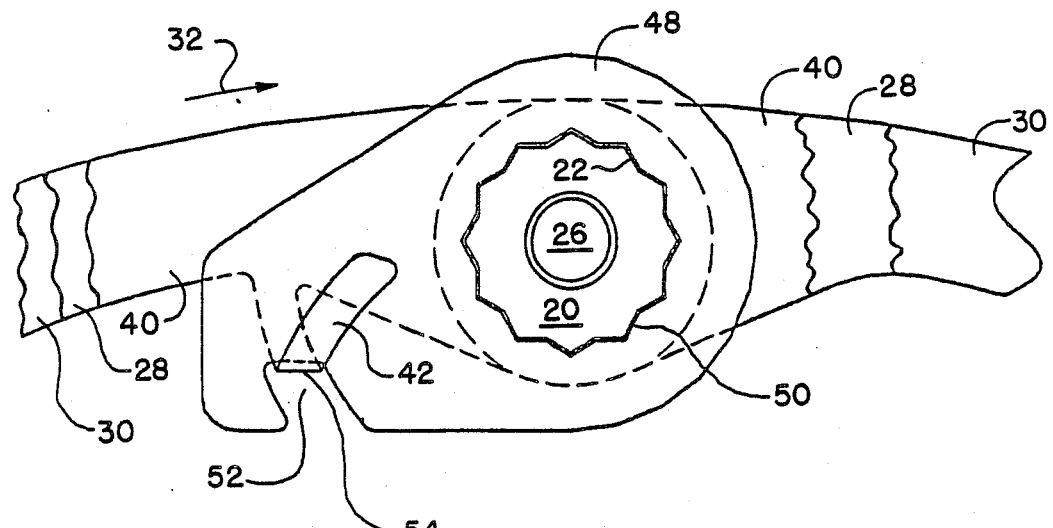
FIG. 1 is a top view of a first embodiment of the anti-rotation locking device of the present invention.
Figure 2:
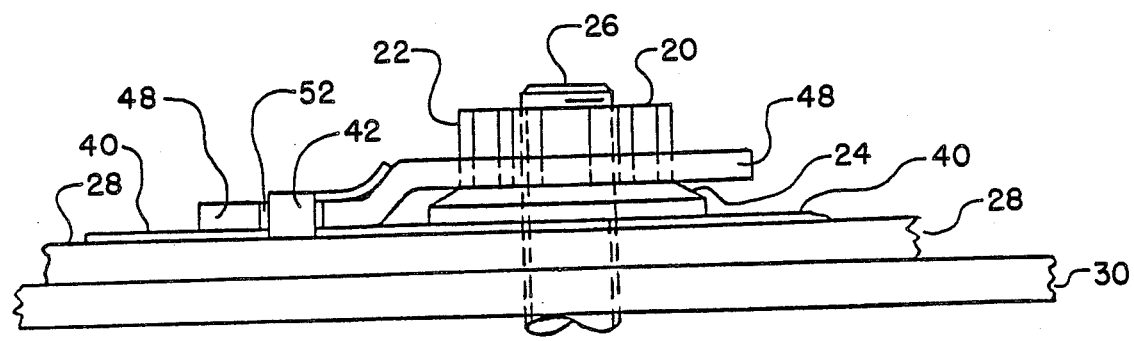
FIG. 2 is a side view of the first embodiment of the anti-rotation locking device of the present invention.

Referring now specifically to FIGS. 1 and 2 of the drawings, a nut 20 having a multi-point (preferably a twelve point) wrenching surface 22 with an integral washer-like shoulder 24 therebelow, is threaded onto a shank of a bolt 26 which passes through and joins two rotating parts 28 and 30. Only a representative arcuate segment of parts 28 and 30 and one nut 20 are shown in the drawings. It will be apparent, however, that parts 28 and 30 may be ring-shaped and may be joined by additional nuts 20 and bolts 26. In operation, the entire circular assembly is caused to rotate in the direction indicated by arrow 32.

Positioned intermediate and captured between shoulder 24 and part 28 is a first cooperative member of the locking device of the present invention, namely, strap member 40. Strap member 40 is also ring-shaped and has an arcuate tang 42 extending therefrom for each nut 20. Tang 42, before it is bent as shown in FIGS. 1 and 2, describes an arc about the rotational axis of nut 20.

After nut 20 has been threaded onto the shank of bolt 26, and has been tightened to the desired value of torque, a second cooperative member of the locking device of the present invention, namely retainer member 48, is slipped over the wrenching surface 22 of nut 20. Retainer member 48 has a toothed opening 50 therethrough which engages the wrenching surface 22 of nut 20.

Retainer member 48 also has an arcuate slot 52 therein having substantially the same radius from the rotational axis of nut 20 as does strap tang 42. Strap tang 42 is then lifted and passed through retainer slot 52, is brought to bear against the bottom 54 of slot 52, and is bent and folded back against the top surface of retainer member 48. Nut 20, which has a conventional right hand thread, is now restrained from loosening by the cooperative action of strap member 40 and retainer member 48.

It should be mentioned here that an advantage provided by the specific shape of the locking device of the present invention is that the unbalance or overhang of the retainer material near slot 52, i.e., the asymmetry of retainer member 48 about the rotational axis of nut 20, provides a retaining or restoring torque when the locking device is used on rotating parts. This restoring torque reduces the load on strap tang 42.

Figure 3:
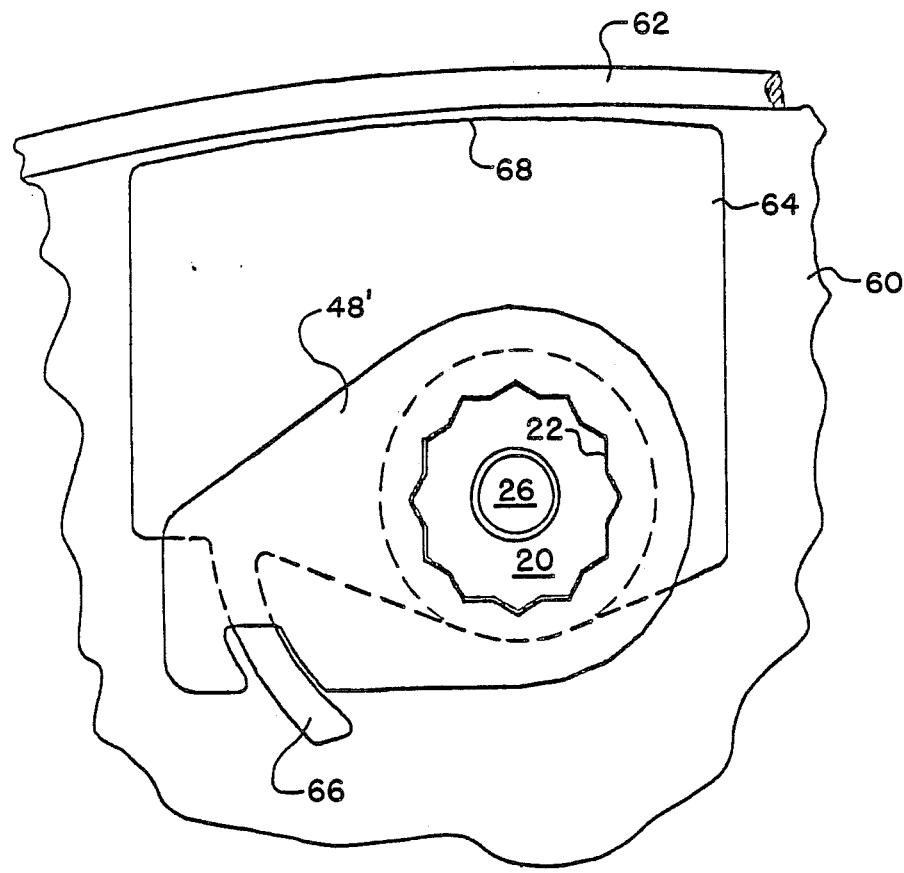
FIG. 3 is a top view of the second embodiment of the anti-rotation locking device of the present invention.

FIG. 3 illustrates an embodiment of the present invention which is useful in applications where only a single nut 20 is to be locked against rotation, and a joined part 60 has a flange 62 in the vicinity of nut 20. Here, a strap member 64 having a tang 66 and secured under only one nut 20, has an edge 68 which abuts flange 62.

Figure 4:
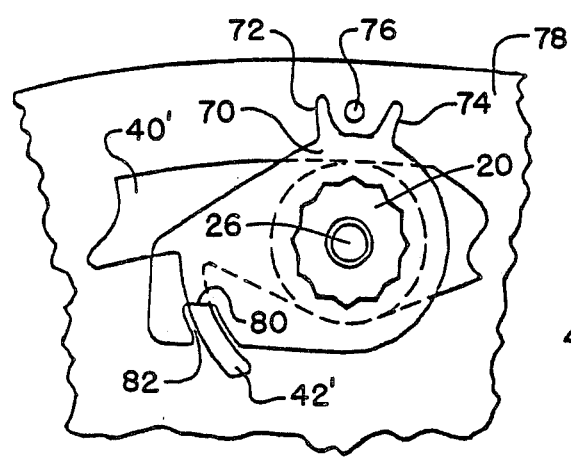
FIG. 4 is a top view of a third embodiment of the anti-rotation locking device of the present invention and having a retainer member installation alignment feature.

FIG. 4 depicts an embodiment of the locking device of the present invention wherein a retainer plate 70 has a pair of tabs 72 and 74 extending therefrom, and wherein a pin 76 is provided on the exposed surface of a joined part 78. After nut 20 has been properly torqued, retainer 70 is positioned over nut 20 in a manner such that pin 76 is located between tabs 72 and 74. This assures that the bottom 80 of slot 82 is always located within the capture range of tang 82.

Figure 5:
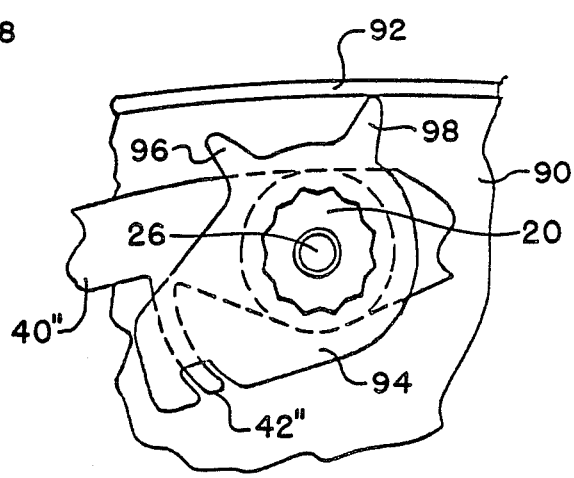
FIG. 5 is a top view of a fourth embodiment of the anti-rotation locking device of the present invention and having a different retainer member installation alignment feature.

FIG. 5 depicts yet another embodiment of the locking device of the present invention which is useful in applications where a joined part 90 has a flange 92 near nut 20, and wherein it is desired that an alignment feature be provided for assuring proper installation of a retainer member 94 over nut 20. Here, retainer member 94 has a pair of tabs 96 and 98 which will interfere with flange 92 and prevent the installation of retainer member 94 unless and until retainer member 94 is properly aligned for insertion over nut 20.

Although the invention has been described with reference to a particular embodiment thereof, it will be understood by those skilled in the art that the invention is capable of a variety of additional embodiments that come within the spirit and scope of the appended claims.

What is claimed is:

1. Apparatus for locking the wrenching surface of a threaded fastener to prevent the loosening thereof in a joined part, said apparatus comprising:

a strap member having at least one circular hole therethrough for securing said strap member under the wrenching surface of an associated fastener, said strap member also having a bendable arcuate tang extending therefrom at a constant radius about the axle of said hole;

and a retainer member having an opening therethrough for engaging angular portions of said wrenching surface of said fastener, said retainer member also having an arcuate slot therein of substantially the same constant radius as that of said arcuate tang of said strap member, whereby a portion including the bottom of said arcuate slot lies along the length of said arcuate tang;

said tang having a width sufficiently narrow to pass through said slot, said tang being bent about the bottom of said slot and folded back upon said retainer member.

2. Apparatus as defined in claim 1 wherein a portion of the periphery of said retainer member is curved to abut and bear against a raised flange on the periphery of said joined part to prevent movement of said strap member with respect to said joined part.

3. Apparatus as defined in claim 1 wherein said retainer member has a pair of retainer member alignment tabs extending radially therefrom.

4. Apparatus as defined in claim 3 wherein said threaded fastener has a multi-point wrenching surface, said pair of tabs have an angular separation substantially equal to the angular separation between the points of said multipoint wrenching surface, and wherein said pair of tabs are of sufficient length to engage a pin protruding therebetween from the surface of said joined part.

5. Apparatus as claimed in claim 3 wherein said pair of alignment tabs are of sufficient length to bear against a flange extending from the periphery of said joined part.

* * * * *